(No Model.)
E. J. STODDARD.
MEANS FOR TRANSMITTING ROTARY MOTION.
No. 363,859. Patented May 31, 1887.
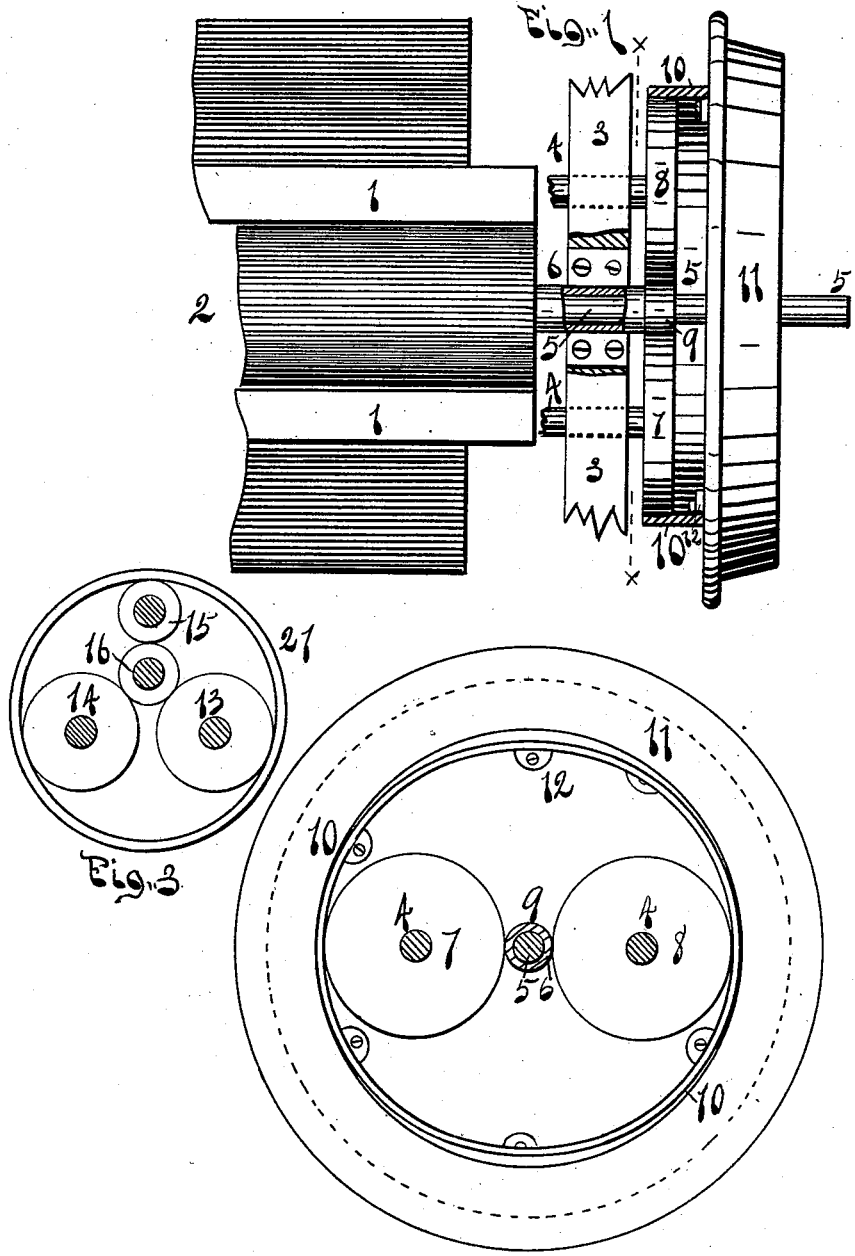
Witness
Lewis Torrey
H. C. Hadstate
Inventor
E. J. Stoddard

UNITED STATES PATENT OFFICE.

ELLIOTT J. STODDARD, OF DETROIT, MICHIGAN, ASSIGNOR OF ONE-HALF TO EDWARD S. GRECE, OF SAME PLACE.

MEANS FOR TRANSMITTING ROTARY MOTION.

SPECIFICATION forming part of Letters Patent No. 363,859, dated May 31, 1887.

Application filed February 5, 1887. Serial No. 236,616. (No model.)

*To all whom it may concern:*

Be it known that I, ELLIOTT J. STODDARD, of Detroit, in the county of Wayne and State of Michigan, have invented a new and useful Improvement in Means for Transmitting Rotary Motion, of which the following is a specification.

My invention relates to transmitting rotary motion; and the special object of my invention is to provide a way in which the rapid rotation of the armature of an electric motor can be reduced in being transmitted to the driving-wheel of a car, and by which the loss of power because of the friction incident to such transmission can be largely avoided, although my invention may be used for a variety of purposes. I attain these objects by the means illustrated in the accompanying drawings, in which—

Figure 1 is a plan view, partly in section, of a part of an electric motor coupled to the driving-wheel of a car in the method which is my invention. Fig. 2 is a section on the line $xx$, Fig. 1, showing the wheel of the car and means by which the rotation of the armature of the electric motor is communicated to it. Fig. 3 shows a modification of my invention.

1 1 are the field-magnets, and 2 is the armature of an electric motor.

3 is a part of the frame of the car. 6 is a sleeve passing over the axle 5 of the car-wheel 11, which constitutes the axle of the armature 2. 10 is a circular band, of steel or other flexible metal, secured rigidly to the car-wheel 11 by lugs 12 or other convenient means, so that it will be concentric with said wheel. I prefer to make the diameter of that part of the band 10 which is farthest from the wheel somewhat smaller than the part next to the wheel, for reasons that will be hereinafter pointed out.

7 and 8 are wheels, preferably of steel or chilled iron, secured to axles 4 4. The bearings of the axles 4 4 in the frame 3 should be made movable toward or away from the axle 5 of the car-wheel 11, so that the wear of said wheels will be taken up by the elasticity of the band 10 and the movement of the said bearings.

9 is a wheel secured to the sleeve (or axle of the armature) 6.

The axles 4 4 5 are in line with each other.

The size of the wheels 7 8 9 are such that the sum of their diameters is a little larger than the diameter of the band 10 at the part of said band at which the wheels 7 and 8 come into contact with it. I prefer to make the sum of the diameters of the wheels 7, 8, and 9 equal to the diameter of the band 10 next to the wheel 11, so that when said wheels are forced to their position at the part of the band 10 farthest from the wheel 11 the part of said band in contact with the wheels 7 and 8 shall lie evenly on said wheels. The wheels 7, 8, and 9 being longer in their united diameters than the diameter of the band 10, strain said band into an elliptical shape, as shown in Fig. 2. The elasticity of the band 10 will force the wheels 7 and 8 against the wheel 9. The revolution of the wheel 9 will act by friction to revolve the wheels 7 and 8, and the wheels 7 and 8 will act by friction to revolve the band 10, which will carry with it the wheel 11.

It will be seen that the pressure of the band 10 (caused by its elasticity) against the wheel 7 is counteracted by the pressure of said band against the wheel 8, so that while sufficient pressure to secure the requisite friction against the acting surfaces of the wheels 7 8 9 and the band 10 to prevent slipping is secured, the pressure, and consequently the friction on the bearings of the wheels, is not increased.

If it is desirable to have the axle of the armature away from the center of the wheel, three wheels, as shown in Fig. 3, may be used, the wheels 13 14 15 pressing against the wheel 16 on the axle of the armature.

It will be noticed that this application is confined to a form of mechanism in which the requisite pressure to secure the necessary friction on the acting parts is secured by the elasticity of the encircling band, as I have another application pending in the United States Patent Office, filed February 11, 1887, and having the Serial No. 227,249, Series of 1880, in which said pressure is secured by the elasticity of the inclosed wheels.

Having fully described my invention, what I wish to claim and secure by Letters Patent is—

1. The combination, with the part of a mechanism to or from which rotary motion is to be communicated, of an elastic circular band attached thereto in such a manner as to be immovable in respect to said part of said mechanism, and three or more wheels adapted to communicate motion by friction, and so arranged within said flexible band with reference to each other and to said band that the pressure of said band upon any one of said wheels shall be balanced by the pressure of said band upon another or others of said wheels, substantially as shown and described.

2. The combination of a wheel, 11, having secured thereto the elastic circular band 10, and the wheels 7 8 9, said wheels being on shafts in a line with each other and forced together by the elasticity of said band, substantially as shown and described.

3. The combination of a wheel, 11, having secured thereto the elastic circular band 10, and the wheels 7 8 9, the wheel 9 being secured to a sleeve over the axle of the wheel 11, and the wheels 7 and 8 being pressed against the wheel 9 by the elasticity of the band 10, substantially as shown and described.

In witness whereof I have hereunto set my hand and seal this 1st day of February, 1887.

ELLIOTT J. STODDARD. [L. S.]

Witnesses:
 FLORA B. GRECE,
 EDWIN D. GRECE.